US012687041B2

(12) United States Patent
Daniels

(10) Patent No.: US 12,687,041 B2
(45) Date of Patent: Jul. 21, 2026

(54) DOOR LOCK DEVICE

(71) Applicant: Osceola Cuts, LLC, Ocilla, GA (US)

(72) Inventor: William Bruce Daniels, Ocilla, GA (US)

(73) Assignee: Osceola Cuts, LLC, Ocilla, GA (US)

(*) Notice: Subject to any disclaimer, the term of this patent is extended or adjusted under 35 U.S.C. 154(b) by 43 days.

(21) Appl. No.: 18/647,809

(22) Filed: Apr. 26, 2024

(65) Prior Publication Data

US 2024/0360699 A1 Oct. 31, 2024

Related U.S. Application Data

(60) Provisional application No. 63/462,840, filed on Apr. 28, 2023.

(51) Int. Cl.
*E05B 63/00* (2006.01)

(52) U.S. Cl.
CPC ................................ *E05B 63/0052* (2013.01)

(58) Field of Classification Search
CPC ...... E05C 19/003; E05C 19/18; E05C 19/184; E05C 19/188; E05C 17/54; E05B 63/0052; E05B 63/04; E05B 65/0032; E05B 65/0035; E05B 65/06
See application file for complete search history.

(56) References Cited

U.S. PATENT DOCUMENTS

| | | | | |
|---|---|---|---|---|
| 2,665,935 | A * | 1/1954 | Patterson | E05C 19/184 292/292 |
| 3,316,005 | A * | 4/1967 | Oesler | E05C 19/18 292/296 |
| 4,198,088 | A | 4/1980 | Tochihara | |
| 4,405,165 | A * | 9/1983 | Johns | E05C 19/182 292/258 |
| 5,152,563 | A | 10/1992 | Fontenot | |
| 5,547,236 | A | 8/1996 | Gregory | |
| 5,590,928 | A | 1/1997 | Voiculescu | |
| 8,376,422 | B2 | 2/2013 | Swink | |
| 9,957,741 | B2 * | 5/2018 | Taylor | E05C 19/00 |
| 9,988,833 | B2 | 6/2018 | Powell | |
| 10,900,267 | B2 | 1/2021 | Mikesell | |

(Continued)

FOREIGN PATENT DOCUMENTS

| | | | |
|---|---|---|---|
| DE | 202018104747 | U1 | 10/2018 |
| GB | 2483919 | | 3/2012 |

OTHER PUBLICATIONS

Daniels, William Bruce; Non-Final Office Action for U.S. Appl. No. 17/683,568, filed Mar. 1, 2022, mailed Dec. 20, 2023, 16 pgs.

(Continued)

*Primary Examiner* — Kristina R Fulton
*Assistant Examiner* — Emily G. Brown
(74) *Attorney, Agent, or Firm* — Buchalter LLP

(57) ABSTRACT

A lock assembly for locking a door includes an attachment plate defining a plate upper end, a plate lower end opposite the plate upper end, a plate first side and a plate second side, the attachment plate defining a mounting plate extending from the plate lower end towards the plate upper end; and a lock bracket defining a lock tab extending laterally outward from the attachment plate at the first plate side and configured to engage a retainer bracket assembly to lock the door in a closed position.

15 Claims, 9 Drawing Sheets

(56) References Cited

U.S. PATENT DOCUMENTS

| | | | | |
|---|---|---|---|---|
| 11,299,911 | B2 | 4/2022 | Geenens et al. | |
| 11,447,991 | B2 | 9/2022 | Taylor et al. | |
| 11,542,734 | B1 | 1/2023 | Gunkler | |
| 12,129,696 | B2 | 10/2024 | Daniels | |
| 2002/0067046 | A1 | 6/2002 | Cox | |
| 2003/0067176 | A1 | 4/2003 | Stevens et al. | |
| 2010/0064585 | A1* | 3/2010 | Gertz | E05C 19/184 292/259 R |
| 2014/0217754 | A1 | 8/2014 | Taylor et al. | |
| 2015/0076844 | A1* | 3/2015 | Taylor | E05C 19/184 292/338 |
| 2017/0145721 | A1 | 5/2017 | Taylor et al. | |
| 2017/0211301 | A1* | 7/2017 | Richmond | E05B 63/18 |
| 2017/0260781 | A1 | 9/2017 | Shiffler et al. | |
| 2017/0335599 | A1* | 11/2017 | Casternovia | E05C 17/166 |
| 2018/0333600 | A1 | 11/2018 | Pristach | |
| 2019/0003221 | A1 | 1/2019 | Taylor et al. | |
| 2020/0063475 | A1* | 2/2020 | Seelbinder | G08B 5/36 |
| 2020/0199921 | A1* | 6/2020 | Grenier | E05C 19/184 |
| 2020/0318405 | A1 | 10/2020 | Taylor et al. | |
| 2021/0025205 | A1 | 1/2021 | Taylor et al. | |
| 2021/0388654 | A1 | 12/2021 | Daniels | |
| 2022/0205294 | A1 | 6/2022 | Taylor et al. | |
| 2022/0282536 | A1 | 9/2022 | Daniels | |
| 2023/0349212 | A1* | 11/2023 | McIntire | E05C 17/08 |
| 2025/0020007 | A1 | 1/2025 | Daniels | |

OTHER PUBLICATIONS

Daniels, William Bruce; Notice of Allowance for U.S. Appl. No. 17/683,568, filed Mar. 1, 2022, mailed Jul. 1, 2024, 11 pgs.

Non-Final Office Action for U.S. Appl. No. 18/899,989, mailed Apr. 1, 2026, 23 pgs.

* cited by examiner

DOOR LOCK DEVICE

CROSS-REFERENCE TO RELATED APPLICATIONS

The present application claims the benefit of U.S. Provisional Application No. 63/462,840, filed Apr. 28, 2023, which is hereby specifically incorporated by reference herein in its entirety.

TECHNICAL FIELD

This disclosure relates to doors. More specifically, this disclosure relates to a lock assembly for doors.

BACKGROUND

Locks for doors are sometimes employed to prevent unauthorized access through the door. Conventional locks often comprise piece of metal that slides out from the door and engages an opening in surrounding door frame. However, if enough force is applied to the lock, the lock can fail or break, allowing the door to be opened, which can present a danger in situations where the door must be secured, such as a lockdown situation involving an unwelcome intruder.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a lock assembly for locking a door, the lock assembly comprising an attachment plate defining a plate upper end, a plate lower end opposite the plate upper end, a plate first side and a plate second side, the attachment plate defining a mounting plate extending from the plate lower end towards the plate upper end; and a lock bracket defining a lock tab extending laterally outward from the attachment plate at the first plate side and configured to engage a retainer bracket assembly to lock the door in a closed position.

Also disclosed is a door lock device comprising a door mount configured to be coupled to a door; and a lock assembly removably mounted on the door mount and comprising a lock tab; and a retainer bracket assembly configured to be coupled to a structure adjacent to the door, the retainer bracket assembly at least partially defining a retainer channel, the lock tab engaging the retainer channel in a locked configuration to lock the door in a closed position.

Further disclosed is a method of locking a door, the method comprising providing a lock assembly, the lock assembly comprising a mounting slot and a lock tab; mounting the lock assembly to the door to secure the door in a closed position, wherein mounting the lock assembly to the door comprises: slidably engaging a mounting guide of a door mount with the mounting slot of the lock assembly, the door mount secured to the door; and slidably engages the lock tab of the lock assembly with a retainer channel of a retainer bracket, the retainer bracket secured to a structure adjacent to the door.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
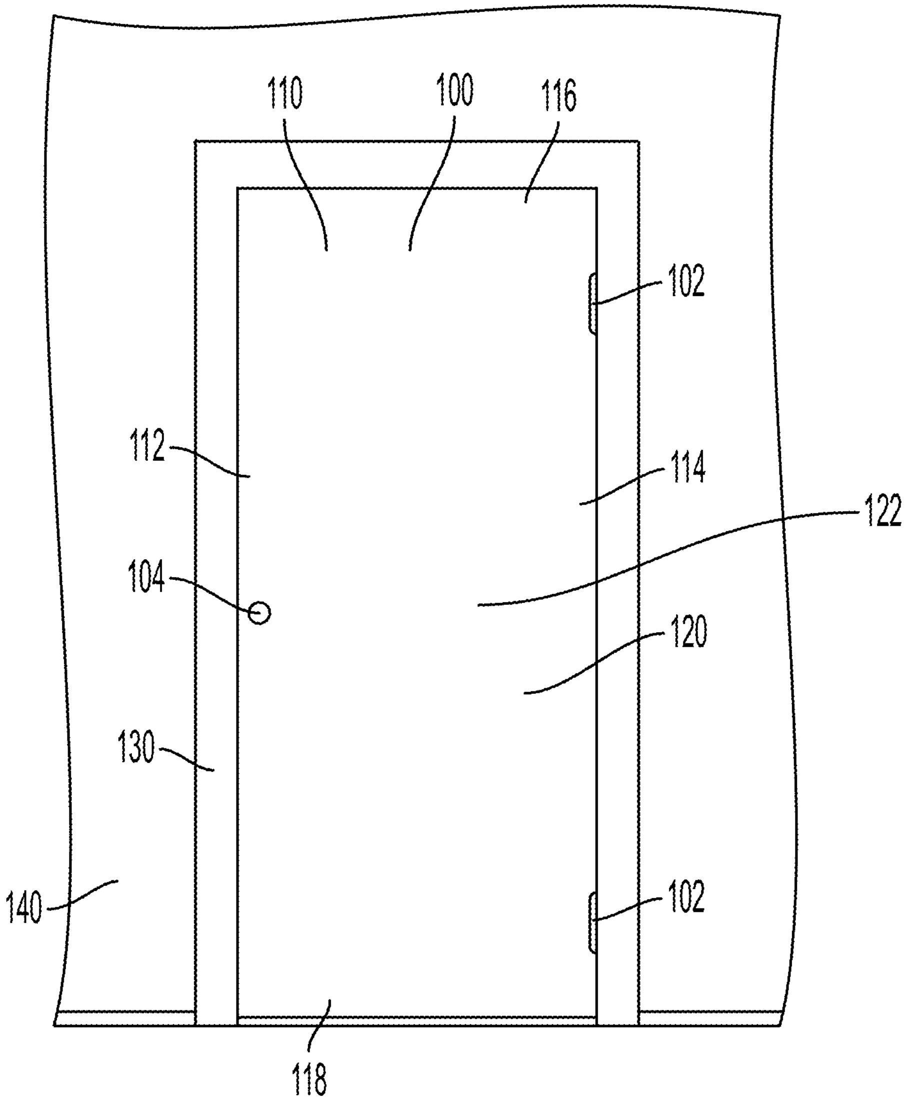
FIG. 1 is a front view of a door.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms “a,” “an” and “the” include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a door lock device and associated methods, systems, devices, and various apparatus. Example aspects of the door lock device can comprise a door mount and a lock assembly mountable on the door mount. It would be understood by one of skill in the art that the door lock device is described in but a few exemplary embodiments among many. No particular terminology or description should be considered limiting on the disclosure or the scope of any claims issuing therefrom.

FIG. 1 is a front perspective view of a prior art door 100. The door 100 can comprise a door panel 110 defining a first door side 112, a second door side 114 opposite the first door side 112, a top door end 116, and a bottom door end 118 opposite the top door end 116. The door panel 110 can further define a door panel front face 120 at a front door side 122 of the door 100 and door panel rear face (not shown) opposite the door panel front face 120 at a rear door side (not shown) of the door 100. In example aspects, one or more hinges 102 can be coupled to the door panel 110 at the second door side 114 thereof. The hinges 102 can be configured to pivotably mount the door 100 to a door frame 130, which can be defined by or coupled to a wall 140 or other surrounding structure. In some aspects, a door knob 104 or door handle can be coupled to the door panel 110 proximate to the first door side 112, which can be gripped by a user to pivot the door 100 relative to the door frame 130 between open and closed positions. In some aspects, the door 100 can be opened towards the front door side 122 and away from the rear door side (i.e., in a direction coming out of the page), and in other aspects, the door 100 can be opened towards the rear door side and away from the front door side 122 (i.e., in a direction going into the page). In some aspects, the door 100 can be opened towards both of the front door side 122 and the rear door side.

Figure 2:
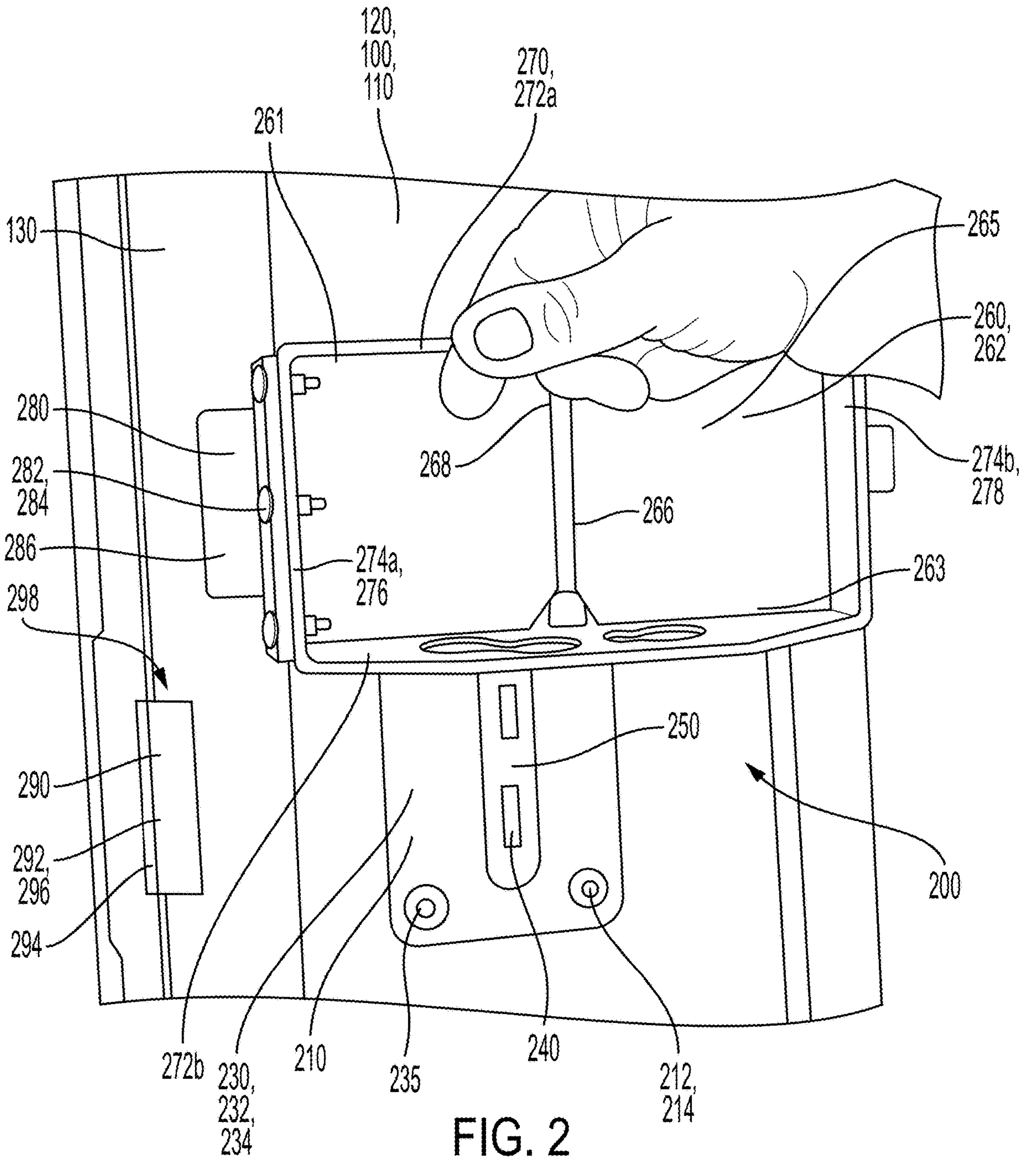
FIG. 2 is a front perspective view of a door lock device, in accordance with one aspect of the present disclosure.

FIG. 2 is a perspective view of a door lock device 200 being mounted to the door 100 to lock the door 100 in a locked configuration. Example aspects of the door lock device 200 can comprise a door mount 210, a lock assembly 260, and a retainer bracket assembly 290. The door mount 210 can be secured to the door panel 110 of the door 100, and the retainer bracket assembly 290 can be secured to the door frame 130 or other suitable structure adjacent to the door 100 (such as the surrounding wall 140, shown in FIG. 1). The lock assembly 260 can be selectively mounted to the door mount 210 and can engage the retainer bracket assembly 290 to lock the door 100 in the closed position as needed. For example, the door lock 200 can be utilized in lockdown situations in buildings such as offices, schools, and government facilities, wherein a person inside of a room wishes to reinforce the door 100 from the inside.

According to example aspects, the door mount 210 can comprise a rear base plate 320 (shown in FIG. 3) and a front mounting assembly 230. The door mount 210 can further comprise one or more mounting fasteners 212 for coupling the door mount 210 to the door 100. In example aspects, the rear base plate 320 can be positioned at the door panel rear face of the door 100, and the front mounting assembly 230 can be positioned at the door panel front face 120 (shown in FIG. 1) of the door 100. Each of the mounting fasteners 212 can extend through the door panel 110 from the door panel front face 120 to the door panel rear face, and can engage each of the rear base plate 320 and the front mounting assembly 230 to couple the door mount 210 to the door 100. For example, each of the mounting fasteners 212 can be configured to extend through a corresponding bore formed through the door panel 110. In the present aspect, each of the mounting fasteners 212 can comprise a threaded bolt 214. In other aspects, the mounting fasteners 212 can be any suitable fastener known in the art, including but not limited to, screws, rivets, adhesives, and the like. Other aspects of the door mount 210 may not comprise the rear base plate 320 and can comprise the front mounting assembly 230 only.

Figure 3:
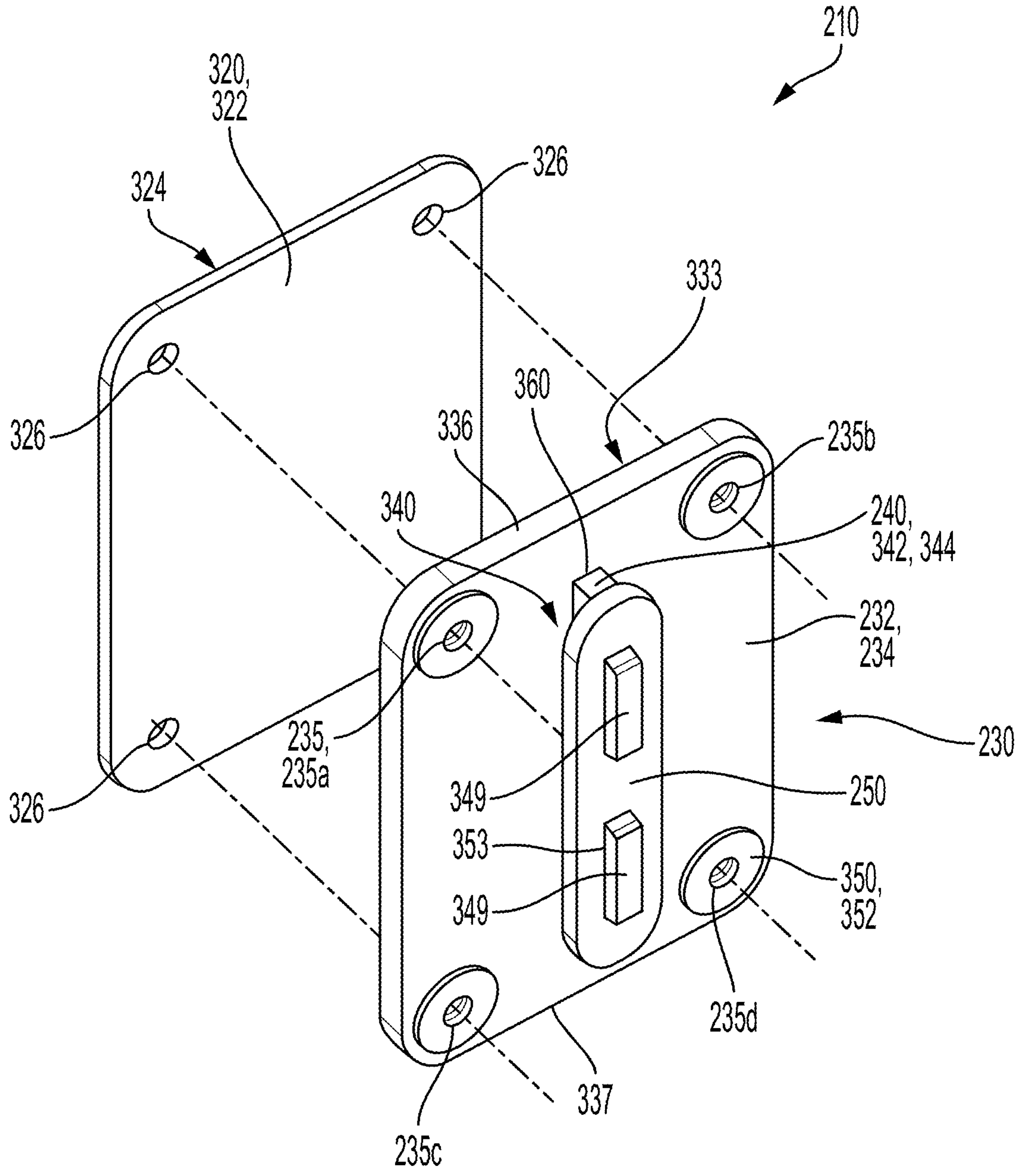
FIG. 3 is a perspective, exploded view of a door mount of the door lock device of FIG. 2.

According to example aspects, the front mounting assembly 230 can comprise a front base plate 232. The front base plate 232 can define a front inner surface 333 (shown in FIG. 3) that can be configured to confront the door panel front face 120 of the door panel 110 when mounted to the door 100. The front base plate 232 can further define a front outer surface 234 opposite the front inner surface 333. Each of the front inner surface 333 and front outer surface 234 can be substantially planar in the present aspect. Furthermore, one or more front mounting holes 235 can be formed through the front base plate 232 and can extend from the front inner surface 333 to the front outer surface 234. Each of the threaded bolts 214 can extend through a corresponding one of the front mounting holes 235. In example aspects, each of the front mounting holes 235 can be threaded, as shown in FIG. 3. Example aspects of the rear base plate 320 can define a rear inner surface 322 (shown in FIG. 3) that can be configured to confront the door panel rear face of the door panel 110 when mounted to the door 100. The rear base plate 320 can further define a rear outer surface 324 (shown in FIG. 3) opposite the rear inner surface 322. Each of the rear inner surface 322 and the rear outer surface 324 can be substantially planar and parallel to one another in the present aspect. One or more rear mounting holes 326 (shown in FIG. 3) can be formed through the rear base plate 320 and can extend from the rear inner surface 322 to the rear outer surface 324. Each of the threaded bolts 214 can further extend through a corresponding one of the rear mounting holes 326.

To secure the door mount 210 to the door 100, each of the threaded bolts 214 can be received through a corresponding one of the rear mounting holes 326 and can threadedly engage a corresponding one of the front mounting holes 235. In example aspects, a bolt head of each threaded bolt 214 can abut the rear outer surface 324 of the rear base plate 320. In some aspects, the mounting fasteners 212 can include a tamper-resistant feature, such that the mounting fasteners 212 can be difficult or impossible to remove from the door mount 210 with a standard tool (such as a combination wrench or a Phillips screwdriver) when standing on the rear door side of the door 100. In some aspects, the tamper-resistant feature of each mounting fastener 212 can comprise a uniquely-shaped screw head or bolt head. For example, the mounting fasteners 212 can comprise, for example and without limitation, a spanner head, a torx or security torx head, a Pozidriv head, a domed head, a hex head, a spline head, a tri-wing head, or any other suitable head shape providing increased tamper-resistance. However, special equipment may be provided for occasions when the door mount 210 must be removed by an appropriate authority, such as the police, firemen, a school or office administrator, etc.

Example aspects of the front mounting assembly 230 can further comprise a mounting guide 240 and a guide cap 250. The mounting guide 240 can extend outward from the front base plate 232, and the guide cap 250 can be attached to the mounting guide 240 distal to the front base plate 232. In the present aspect, each of the mounting guide 240 and the guide cap 250 can be elongated in a longitudinal direction, relative to the orientation shown. According to example aspects, a mounting channel 340 (shown in FIG. 3) can substantially surround the mounting guide 240 between the front base plate 232 and the guide cap 250, as described in further detail below.

The lock assembly 260 can comprise an attachment plate 262 configured to selectively mount the lock assembly 260 on the door mount 210. The attachment plate 262 can define a plate upper end 261 and a plate lower end 263 opposite the plate upper end 261. Example aspects of the attachment plate 262 can further define an attachment inner surface 564 (shown in FIG. 5) and an attachment outer surface 265 opposite the attachment inner surface 564. The attachment inner surface 564 can be configured to confront the front base plate 232 when mounted on the door mount 210, and the attachment outer surface 265 can be configured to confront the guide cap 250 when mounted on the door mount 210. Each of the attachment inner surface 564 and attachment outer surface 265 can be substantially planar and parallel to one another in the present aspect.

In the present aspect, the attachment plate 262 can define a mounting slot 266 extending from the plate lower end 263 towards the plate upper end 261. To mount the attachment plate 262 to the door mount 210, the mounting slot 266 can be aligned vertically above the mounting guide 240, relative to the orientation shown. The attachment plate 262 can then be lowered onto the door mount 210 with the mounting guide 240 engaging and sliding vertically within the mounting slot 266. According to example aspects, an upper guide end 342 (shown in FIG. 3) of the mounting guide 240 can engage an upper slot end 268 of the mounting slot 266 to support the lock assembly 260 on the door mount 210. Furthermore, portions of the attachment plate 262 surrounding the mounting slot 266 can be received within the mounting channel 340 defined between the front base plate 232 and the guide cap 250. The attachment plate 262 can be oriented about parallel with the door 100 when the lock assembly 260 is mounted on the door mount 210.

Example aspects of the lock assembly 260 can further comprise a lock frame 270 and a lock bracket 280. The lock frame 270 can comprise a first lateral frame member **272*a* extending forwardly outward from the attachment plate 262 at or near the plate upper end 261 and second lateral frame member 272*b* extending forwardly outward from the attachment plate 262 at or near the plate lower end 263, relative to the orientation shown. The first and second lateral frame members 272*a,b* can aid in preventing bending of the attachment plate 262 under a force, such as an intruder attempting to push the door 100 open in the locked configuration. The lock frame 270 can further comprise a first longitudinal frame member 274*a* extending outward from the attachment plate 232 at or near a plate first side 276 thereof and a second longitudinal frame member 274*b* extending outward from the attachment plate 232 at or near a plate second side 278 thereof. Each of the first and second longitudinal frame members 274*a,b* can extend between the first and second lateral frame members 272*a,b*, as shown. The first lateral frame member 272*a* can be about parallel to the second lateral frame member 272*b*, and each of the first and second lateral frame members 272*a,b* can be about perpendicular to the attachment plate 232. The first longitudinal frame member 274*a* can be about parallel to the second longitudinal frame member 274*b*, and each of the first and second longitudinal frame members 274*a,b* can be about perpendicular to the first and second lateral frame members 272*a,b* and the attachment plate 232. Other aspects of the lock frame 270 may not comprise any or all of the first and second lateral frame members 272*a,b* and/or the first and second longitudinal frame members 274*a,b***.

In the present aspect, the lock bracket 280 can be coupled to the first longitudinal frame member **274*a* of the lock frame 270, relative to the orientation shown. According to example aspects, one or more frame fasteners 282 can couple the lock bracket 280 to the first longitudinal frame member 274*a*. For example, in the present aspect, each of the frame fasteners 282 can comprise a nut and bolt assembly 284. In other aspects, the lock bracket 280 can be coupled to the second longitudinal frame member 274*b*. The lock bracket 280 can define a lock tab 286 extending laterally outward from the first longitudinal frame member 274***a*, as shown. The lock tab 286 of the lock bracket 280 can be configured to engage the retainer bracket assembly 290 in the locked configuration to lock door 100 in the closed position.

As shown, the retainer bracket assembly 290 can be mounted to the door frame 130 in the present aspect. In other aspects, the retainer bracket assembly 290 can be mounted to wall 140 or any other suitable structure. The retainer bracket assembly 290 can be mounted to the door frame 130 adjacent to the door mount 210. Example aspects of the retainer bracket assembly 290 can define a substantially L-shaped retainer hook 292 extending forwardly from the door frame 130, relative to the orientation shown. Example aspects of the retainer hook 292 can define a hook side wall 294 extending forwardly outward from the door frame 130 and a hook end wall 296 extending from the hook side wall 294, distal to the door frame 130. The hook end wall 296 can be disposed about perpendicular to the hook side wall 294 and can extend laterally towards the door mount 210. A retainer channel 298 can be defined between the hook side wall 294, the hook end wall 296, and the door frame.

According to example aspects, the lock tab 286 of the lock bracket 280 can slide vertically downward into the retainer channel 298 through an open top channel end 430 (shown in FIG. 4) thereof as the lock assembly 260 is mounted onto the door mount 210. The lock tab 286 can engage the hook end wall 296 of the retainer bracket assembly 290 to prohibit the door 100 from opening towards the front door side 122 (i.e., in a direction coming out of the page) and/or the lock tab 286 can engage the door frame 130 to prohibit the door from opening towards the rear door side (i.e., in a direction going into the page).

FIG. 3 illustrates an exploded view of the door mount 210, according to an example aspect of the present disclosure. The door mount 210 can comprise the rear base plate 320 and the front mounting assembly 230. The front mounting assembly 230 can comprise the front base plate 232. Example aspects of the front base plate 232 can further define a base upper end 336 and a base lower end 337 opposite the base upper end 336. One or more of the front mounting holes 235 can be formed through the front base plate 232. In the present aspect, a first pair of the front mounting holes 235*a,b* can be defined proximate to the base upper end 336, and a second pair of the front mounting holes 235*c,d* can be defined proximate to the base lower end 337. Similarly, one or more of the rear mounting holes 326 can be formed through the rear base plate 320. Each of the front mounting holes 235 can be aligned with a corresponding one of the rear mounting holes 326, and one of the mounting fasteners 212 (shown in FIG. 2) can engage each corresponding pair of front and rear mounting holes 235,326 to couple the front base plate 232 and the rear base plate 320 to the door 100 (shown in FIG. 1). In example aspects, each of mounting fasteners 212 can comprise one of the threaded bolts 214, and each of the front mounting holes 235 can define complementary threading, as shown.

Additionally, in some aspects, the door mount 210 can comprise one or more reinforcement features 350 coupled to or formed monolithically (i.e., formed a singular component that constitutes a single material without joints or seams) with the front base plate 232 and configured to reinforce the front mounting holes 235. In the present aspect, the reinforcement features 350 can be formed as reinforcement rings 352 coupled to the front outer surface 234 of the front base plate 232, with each of the reinforcement rings 352 surrounding a corresponding one of the front mounting holes 235. In some aspects, each mounting fastener 212 can further be received through the corresponding reinforcement ring 352. The reinforcement rings 352 may or may not define threading complementary to the mounting fasteners 212. In some aspects, the door mount 210 can comprise additional reinforcement features 350 for reinforcing the rear mounting holes 326. Other aspects of the door mount 210 may not comprise such reinforcement features 350.

The bolt head of each mounting fastener 212 can abut the rear outer surface 324 of the rear base plate 320. The bolt heads of the mounting fasteners 212 can be domed in some aspects or can be otherwise configured to prevent the mounting fasteners 212 from being removed from the door mount 210 with a common tool (e.g., a wrench). Thus, the door 100 can be unbreachable from the second door side 114 in the locked configuration (i.e., the side of the door 100 at which the rear base plate 320 is mounted) unless a special tool is provided for removing the mounting fasteners 212. In some aspects, such special equipment can be provided to an appropriate authority, such as the police, firemen, a school or office administrator, etc., who may need to breach the door 100 in an emergency situation.

The front mounting assembly 230 can further comprise the mounting guide 240 and the guide cap 250. The mounting guide 240 can extend forwardly outward from the front base plate 232, about perpendicular thereto. The guide cap 250 can be attached to the mounting guide 240 opposite the front base plate 232, about parallel to the front base plate 232. The mounting channel 340 can be defined between the front base plate 232 and the guide cap 250 and can substantially surround the mounting guide 240 extending therebetween. The mounting guide 240 can be configured to engage the mounting slot 266 (shown in FIG. 2) of the attachment plate 262 (shown in FIG. 2). As shown, the mounting guide 240 can define the upper guide end 342. The upper guide end 342 can define a guide shoulder 344 that can support the lock assembly 260 (shown in FIG. 2) thereon.

In some aspects, the mounting guide 240 can further define one or more base engagement tabs (not shown). Each of the base engagement tabs can engage a corresponding base engagement opening 360 formed in the front base plate 232 to couple the mounting guide 240 thereto. The mounting guide 240 can also comprise one or more cap engagement tabs 349. Each of the cap engagement tabs 349 can engage a corresponding cap engagement openings 353 of the guide cap 250 to mount the guide cap 250 to the mounting guide 240. In some aspects, the base engagement tabs can be similar to or substantially the same as the cap engagement tabs 349. In other aspects, the mounting guide 240 can be coupled to either or both of the front base plate 232 and the guide cap 250 by any other suitable fastener or fastening technique, including but not limited to, bolts, screws, rivets, welding, adhesives, and the like. In other aspects, such as the aspect shown in FIG. 9, the mounting guide 240 can be monolithically formed with either or both of the front base plate 232 and the guide cap 250.

Figure 4:
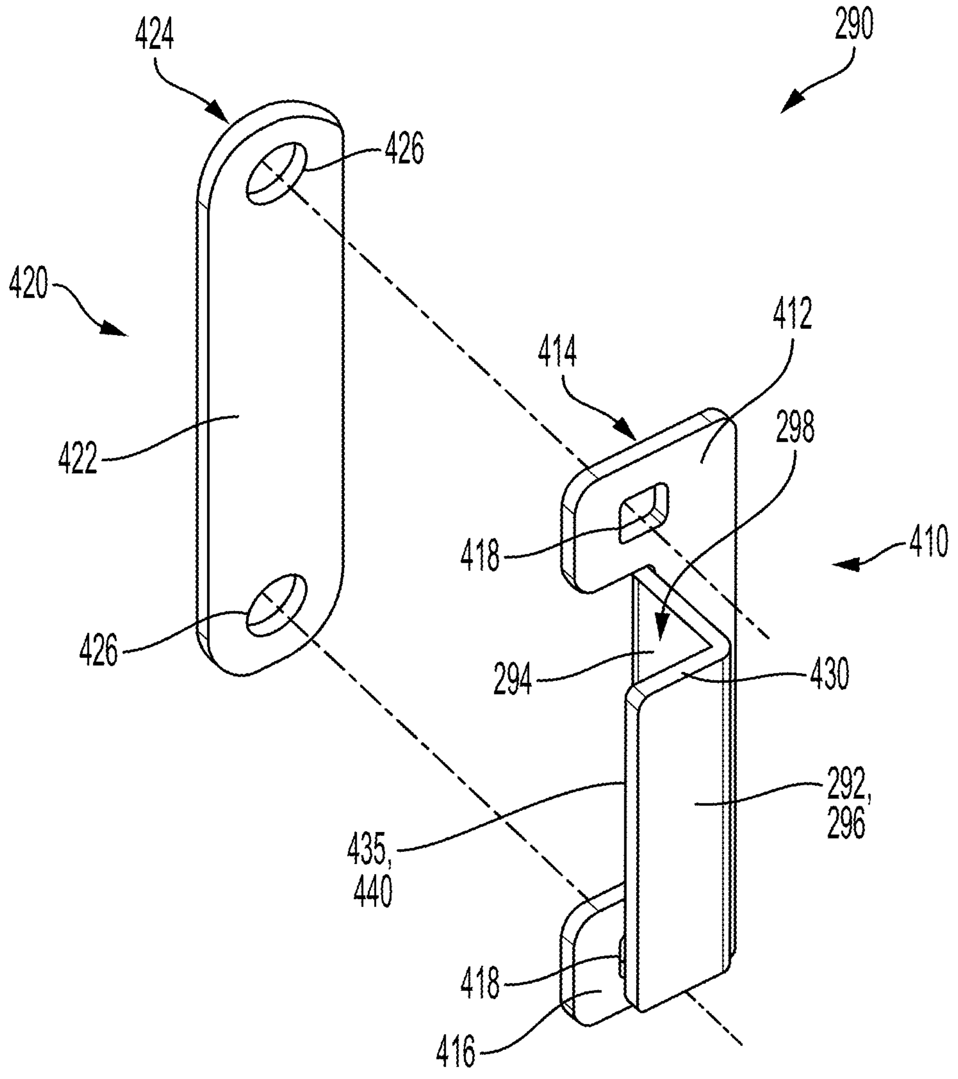
FIG. 4 is a perspective, exploded view of a lock assembly of the door lock device of FIG. 2.

FIG. 4 illustrates an exploded view of the retainer bracket assembly 290, according to an example aspect of the present disclosure. The retainer bracket assembly 290 can comprise a front retainer bracket 410 and a rear bracket plate 420. The rear bracket plate 420 can be coupled to the door frame 130 (shown in FIG. 1) or other structure adjacent to the door 100 (shown in FIG. 1) at the second door side 114 (shown in FIG. 1) (i.e., on the same side of the door 100 as the rear base plate 320, shown in FIG. 3). The front retainer bracket 410 can be horizontally aligned with the rear bracket plate 420 and can be coupled to the door frame 130 or other structure adjacent to the door 100 at the front door side 122 (shown in FIG. 1) (i.e., on the same side of the door 100 as the front mounting assembly 230 and the lock assembly 260, both shown in FIG. 2).

The rear bracket plate 420 can be substantially planar in the present aspect and can define a rear inner bracket surface 422 and a rear outer bracket surface 424. The rear inner bracket surface 422 can be configured to confront the door frame 130 or other structure to which the rear bracket plate 420 is coupled. One or more rear bracket mounting holes 426 can be formed through the rear bracket plate 420 and can extend from the rear inner bracket surface 422 to the rear outer bracket surface 424. The front retainer bracket 410 can define a front bracket plate 412. The front bracket plate 412 can be substantially planar in the present aspect, and can define a front inner bracket surface 414 and a front outer bracket surface 416. The front inner bracket surface 414 can be configured to confront the door frame 130 or other structure to which the front retainer bracket 410 is coupled. One or more front bracket mounting holes 418 can be formed through the front bracket plate 412 and can extend from the front inner bracket surface 414 to the front outer bracket surface 416. Each of the front bracket mounting holes 418 can be aligned with a corresponding one of the rear bracket mounting holes 426, and a bracket fastener (not shown) can engage each corresponding pair of the front and rear bracket mounting holes 426 to couple the retainer bracket assembly 290 to the door frame 130 or other structure. The bracket fastener can be any suitable fastener, including but not limited to, bolts, screws, rivets, nails, and the like. In other aspects, the retainer bracket assembly 290 can be secured to the door frame 130 or other structure by any other suitable fastening technique, including but not limited to, welding, adhering, and the like The front retainer bracket 410 can further comprise the substantially L-shaped retainer hook 292 extending forwardly outward from the front bracket plate 412, relative to the orientation shown. The retainer hook 292 can comprise the hook side wall 294 substantially perpendicular to and extending forwardly outward from the front bracket plate 412. The retainer hook 292 can further comprise the hook end wall 296 substantially perpendicular to and extending laterally from the hook side wall 294, distal to the front bracket plate 412. The hook side wall 294 and the hook end wall 296 can at least partially define the retainer channel 298. The retainer channel 298 can define the open top channel end 430. The retainer channel 298 can further define an open channel side 435 at a distal wall end 440 of the hook end wall 296. The hook end wall 296 can extend in a direction towards the door 100, such that the open channel side 435 can face the lock assembly 260. In some aspects, the hook side wall 294 can be bent relative to the front bracket plate 412 and/or the hook end wall 296 can be bent relative to the hook side wall 294 to define the retainer hook 292. In some aspects, the front retainer bracket 410 can be monolithically formed. In other aspects, the components of the front retainer bracket 410 can be coupled together by any suitable fastener or fastening technique, including but not limited to, bolts, screws, rivets, welding, adhesives, and the like.

Figure 5:
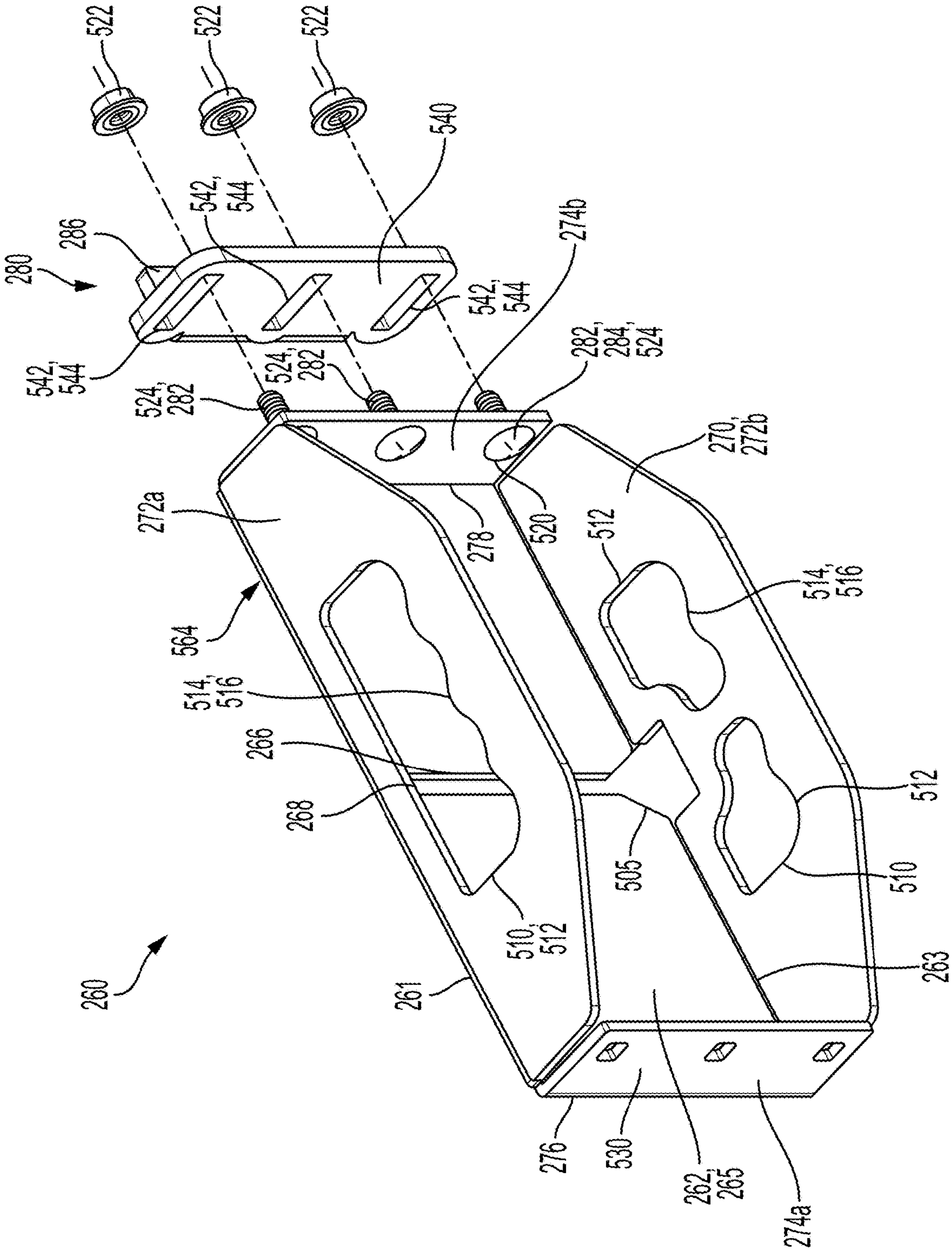
FIG. 5 is a perspective, exploded view of a retainer bracket assembly of the door lock device of FIG. 2.

FIG. 5 illustrates an exploded view of the lock assembly 260, in accordance with an example aspect of the present disclosure. The lock assembly 260 can comprise the attachment plate 262, the first and second lateral frame members **272*a,b*, and the first and second longitudinal frame members 274*a,b*. In some aspects, the first and second lateral frame members 272*a,b* and/or the first and second longitudinal frame members 274*a,b* can be bent relative to the attachment plate 262. In some aspects, the first and second lateral frame members 272*a,b* and/or the first and second longitudinal frame members 274*a,b* can be monolithically formed with the attachment plate 262. In other aspects, the first and second lateral frame members 272*a,b* and/or the first and second longitudinal frame members 274*a,b* can be coupled to the attachment plate 262** by any suitable fastener or fastening technique, including but not limited to, bolts, screws, rivets, welding, adhesives, and the like.

The attachment plate 262 can define the attachment inner surface 564 and the attachment outer surface 265. The attachment plate 262 can further define the plate upper end 261 and the plate lower end 263 opposite the plate upper end 261. The mounting slot 266 can extend into the attachment plate 262 at the plate lower end 263. In some aspects, a lower portion 505 of the mounting slot 266 can taper outwards (i.e., increase in width) towards the plate lower end 263. The increased width of the mounting slot 266 at the plate lower end 263 can facilitate guiding the mounting guide 240 (shown in FIG. 2) of the door mount 210 (shown in FIG. 2) into engagement with the mounting slot 266.

According to example aspects, one or both of the first and second lateral frame members **272*a,b* can define a handle opening 510. A user can extend a hand into the handle opening 510 and can grip the corresponding first and/or second lateral frame members 272*a,b* to facilitate handling the lock assembly 260 to mount and remove the lock assembly 250 to and from the door mount 210 (shown in FIG. 2). In the present aspect, the handle opening 510 of the first lateral frame member 272*a* can be formed as a single grippable opening 512, while the handle opening 510 of the second lateral frame member 272*b* can be formed as a pair of the grippable openings 512. In some aspects, a front opening end 514 of either or both handle openings 510 can define an undulating profile 516, as shown, or any other suitable complex profile. The undulating profile 516 can enable the user to securely grip the corresponding first and/or second lateral frame members 272*a,b*. In other aspects, however, the front opening end 514 of each handle opening 510** can define a simple profile, such as a linear or curved profile.

According to example aspects, one or both of the first and second longitudinal frame members **274*a,b* can define one or more frame openings 520 formed therethrough. In the present aspect, each of the first and second longitudinal frame members 274*a,b* can define three of the frame openings 520. The three frame openings 520 can be vertically spaced along the corresponding first or second longitudinal frame member 274*a,b*. Each of the frame openings 520 can be configured to receive a corresponding one of the frame fasteners 282 therethrough for mounting the lock bracket 280 to the corresponding first or second longitudinal frame member 274*a,b*. The frame fasteners 282 can be the nut and bolt assemblies 284 in the present aspect, each comprising a frame nut 522 and a frame bolt 524**.

Because the frame openings 520 are formed in each of the first and second longitudinal frame members **274*a,b*, the lock bracket 280 can be mounted to either one of the first and second longitudinal frame members 274*a,b*, as desired. For example, the lock bracket 280 can be selectively mounted to the first longitudinal frame member 274*a* for use with a door 100 that opens at the first door side 112 (like the door 100 of FIG. 1), and the lock bracket 280 can be selectively mounted to the second longitudinal frame member 274*b* for use with a door 100 that opens at the second door side 114. In some aspects, the lock assembly 260 can comprise a pair of the lock brackets 280—one mounted to each of the first and second longitudinal frame members 274***a,b*. In other aspects, the first and second longitudinal frame members 274*a,b* can define more or fewer of the frame openings 520. In other aspects, only one of the first and second longitudinal frame members 274*a,b* may define the one or more frame openings 520.

Example aspects of the lock bracket 280 can comprise a securing plate 540 and the lock tab 286 extending from the securing plate 540. The securing plate 540 can be configured to confront an outer frame surface 530 of either of the first or second longitudinal frame members 274*a,b*. The securing plate 540 can define one or more plate openings 542 formed therethrough. In the present aspect, the securing plate 540 can define three of the plate openings 542, and each of the plate openings 542 can be aligned with a corresponding one of the frame openings 520. The frame fasteners 282 can engage each corresponding pair of frame openings 520 and plate openings 542 to couple the lock bracket 280 to the corresponding first or second longitudinal frame member 274*a,b*. In the present aspect, the securing plate 540 can be attached to the second longitudinal frame member 274*b*. In some aspects, each of the plate openings 542 can be formed as a lateral adjustment slot 544. The frame bolt 524 of each frame fastener 282 can slide laterally within the corresponding lateral adjustment slot 544 when the frame fastener 282 is loosened (e.g., the frame nut 522 is loosened or removed) to reposition the lock bracket 280 relative to the lock frame 270. For example, the lock bracket 280 can be repositioned forward or rearward, relative to the orientation shown, to properly align the lock tab 286 of the lock bracket 280 with the retainer channel 298 (shown in FIG. 2).

Figure 6:
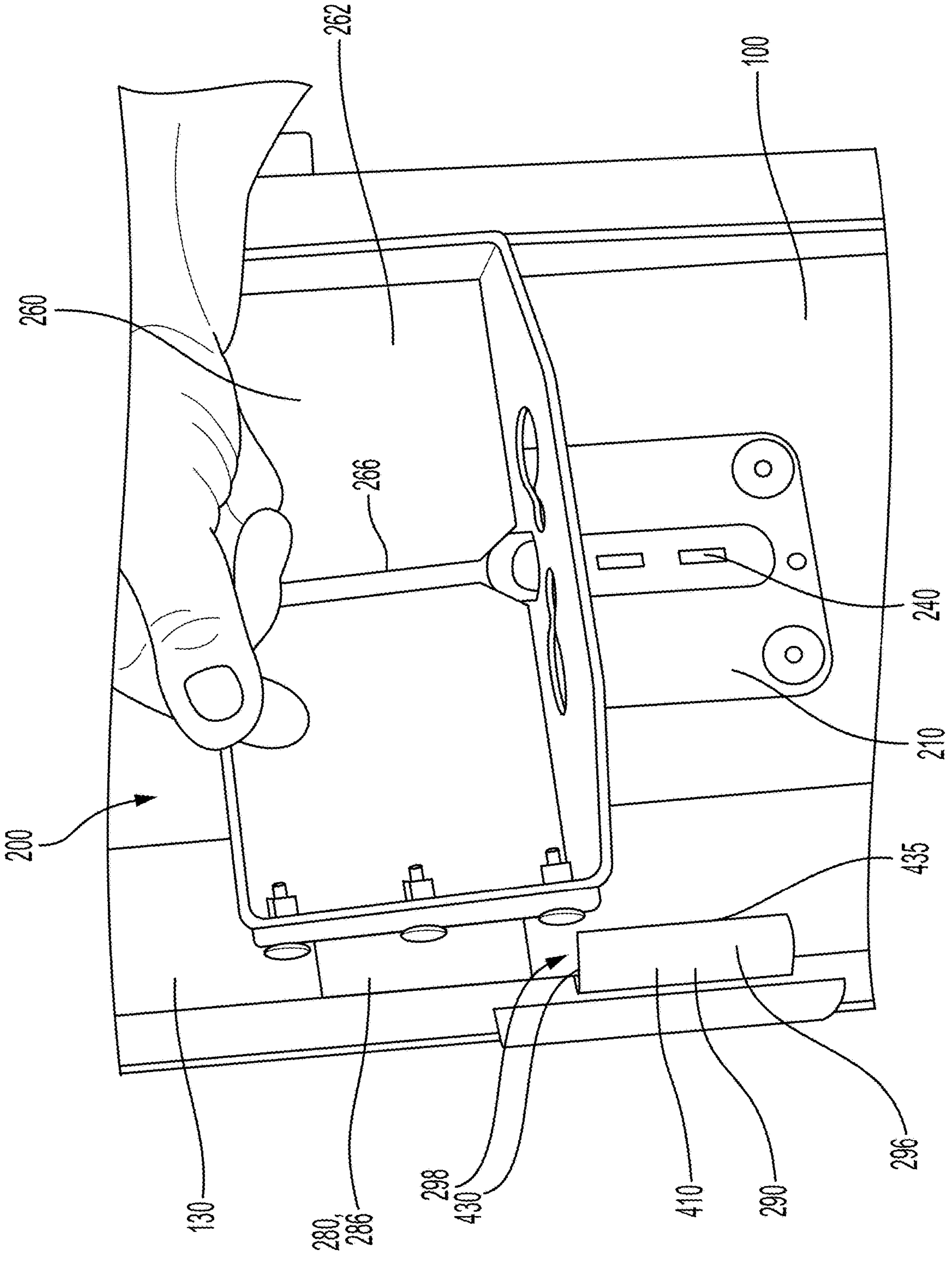
FIG. 6 is a front perspective view illustrating a first step in locking a door with the door lock device of FIG. 2.
Figure 7:
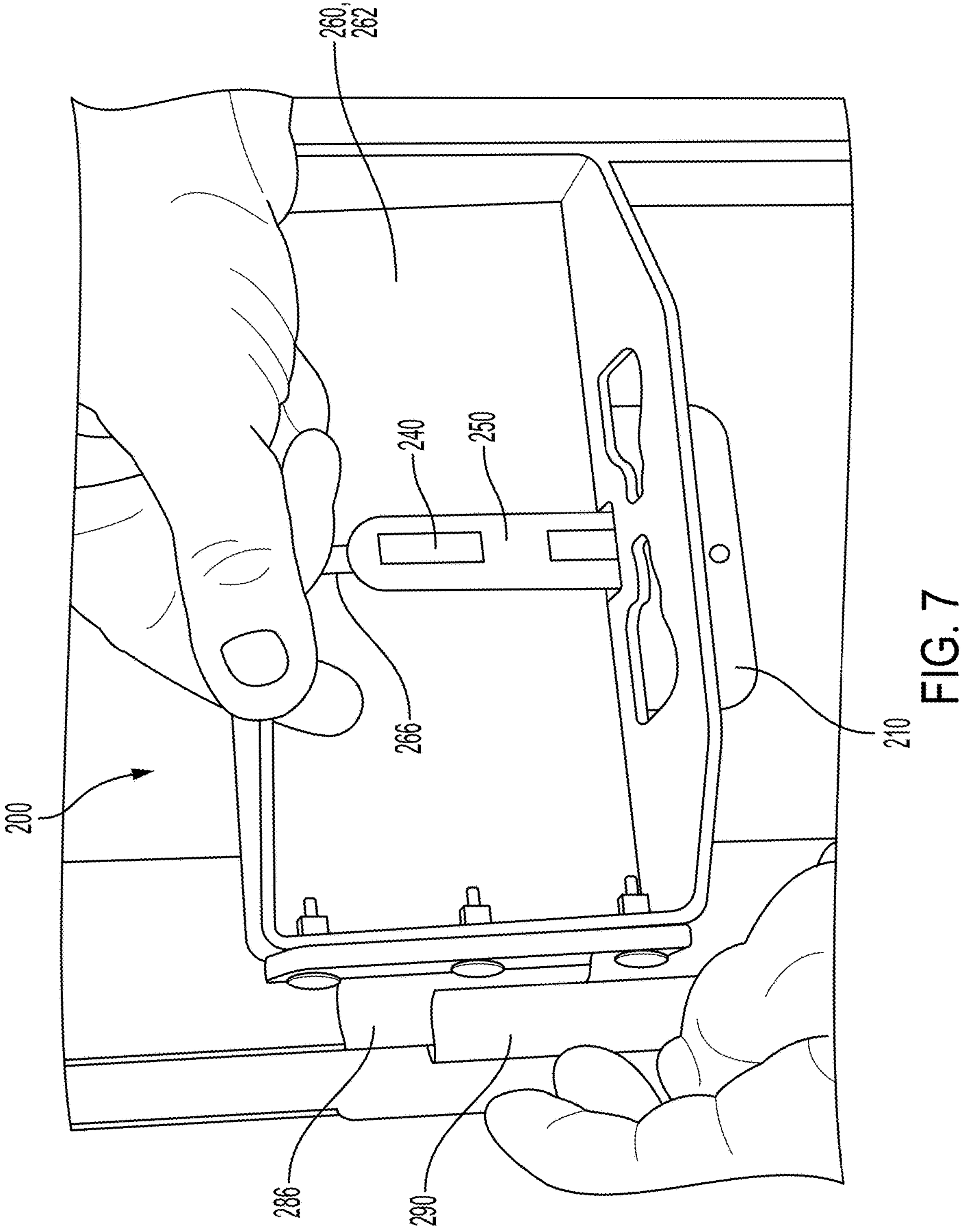
FIG. 7 is a front perspective view illustrating a second step in locking the door with the door lock device of FIG. 2.
Figure 8:
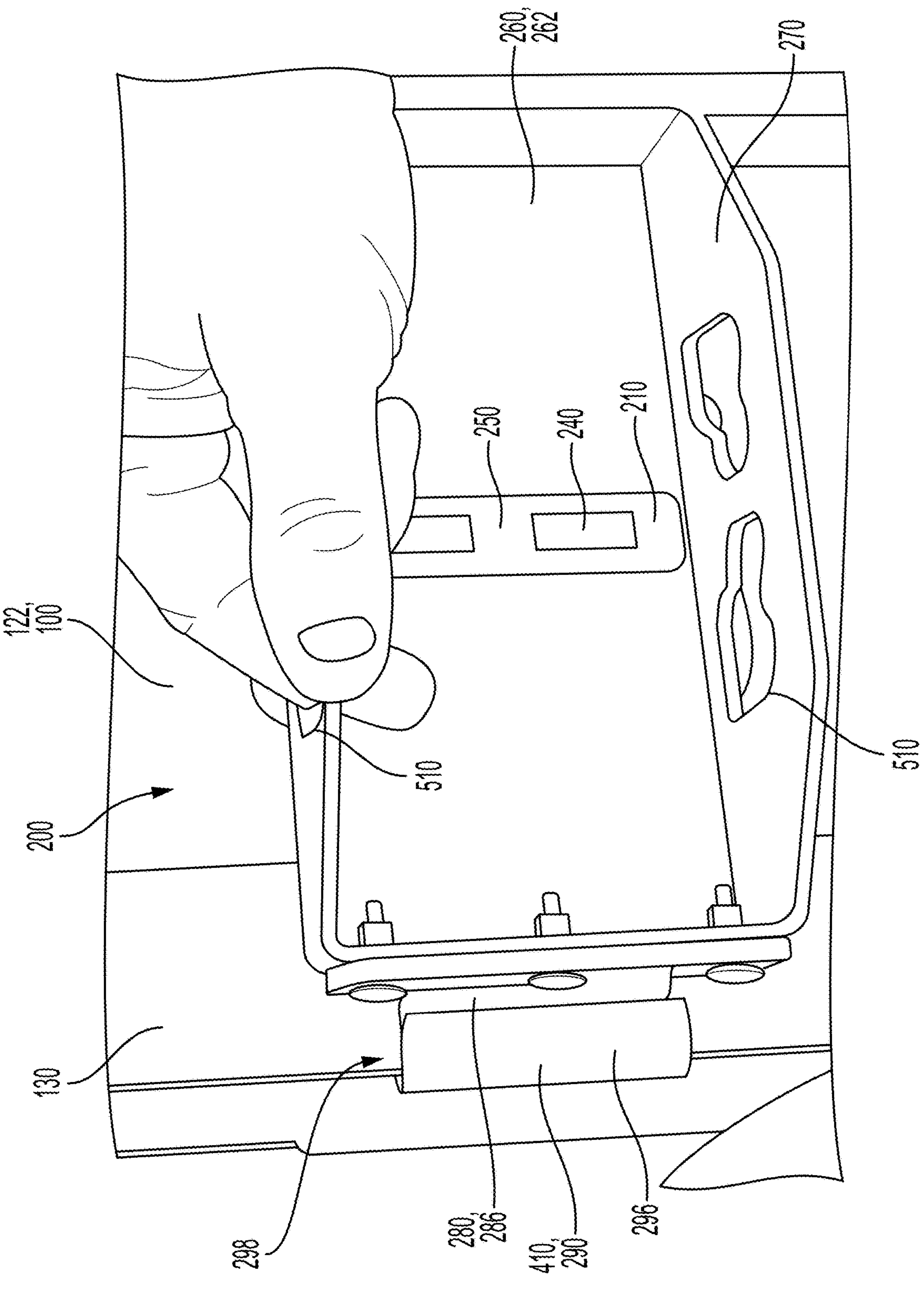
FIG. 8 is a front perspective view illustrating a third and final step in locking the door with the door lock device of FIG. 2.

In the present aspect, the lock tab 286 of the lock bracket 280 can be about perpendicular to and can extend laterally outward from the securing plate 540 of the lock bracket 280. The lock tab 286 can be oriented about parallel with the attachment plate 262 and the door 100 (shown in FIG. 1) in example aspects. In some aspects, the lock tab 286 can be bent relative to the securing plate 540 to define the lock bracket 280. In some aspects, the lock tab 286 can be formed monolithically with the securing plate 540. In other aspects, the lock tab 286 can be coupled to the securing plate 540 by any suitable fastener or fastening technique, including but not limited to, bolts, screws, rivets, welding, adhesives, and the like FIGS. 6-8 illustrate example steps in a method of locking the door 100 with the door lock device 200. Referring to FIG. 6, the door mount 210 is coupled to the door 100 and the retainer bracket assembly 290 is coupled to the door frame 130. The retainer bracket assembly 290 can be substantially laterally aligned with the door mount 210, and the open channel side 435 of the retainer channel 298 faces towards the door mount 210. The lock assembly 260 can define the mounting slot 266, and the mounting slot 266 can be aligned vertically above the mounting guide 240. Additionally, as shown, the lock tab 286 of the lock bracket 280 can be aligned vertically above the retainer channel 298.

The attachment plate 262 can then be lowered onto the door mount 210 with the mounting guide 240 engaging and sliding vertically within the mounting slot 266. Additionally, the lock tab 286 can be lowered towards the front retainer bracket 410 of the retainer bracket assembly 290 and through the open top channel end 430 of the retainer channel 298 to engage and slide vertically within the retainer channel 298. FIG. 7 illustrates the lock assembly 260 in an intermediate position wherein the lock assembly 260 is partially lowered onto the door mount 210. FIG. 8 illustrates the lock assembly 260 fully lowered onto and supported on the door mount 210 in the locked configuration. As shown, the lock tab 286 can be received in the retainer channel 298 between the door frame 130 and the hook end wall 296 of the front retainer bracket 410. The lock tab 286 can engage the hook end wall 296 to prohibit the door 100 from opening towards the front door side 122 and/or the lock tab 286 can engage the door frame 130 to prohibit the door 100 from opening towards the rear door side.

According to example aspects, various components of the door lock device 200 can be formed from a metal material, such as steel, or any other sufficiently strong metal or other material. In some aspects, the components of the door lock device 200 can be laser-cut steel, or can be cast, 3D printed, stamped, or any other desired manufacturing method. For example, some or all of the rear base plate 320 (shown in FIG. 3), the front base plate 232 (shown in FIG. 2), the mounting guide 240, the guide cap 250, the attachment plate 262, the lock frame 270, the lock bracket 280, the rear bracket plate 420 (shown in FIG. 4), and the front retainer bracket 410 can be formed from steel. In other aspects, some or all of the components of the door lock device 200 can be formed from any other suitable material known in the art, including but not limited to, other metal materials, plastics, composites, and the like.

Figure 9:
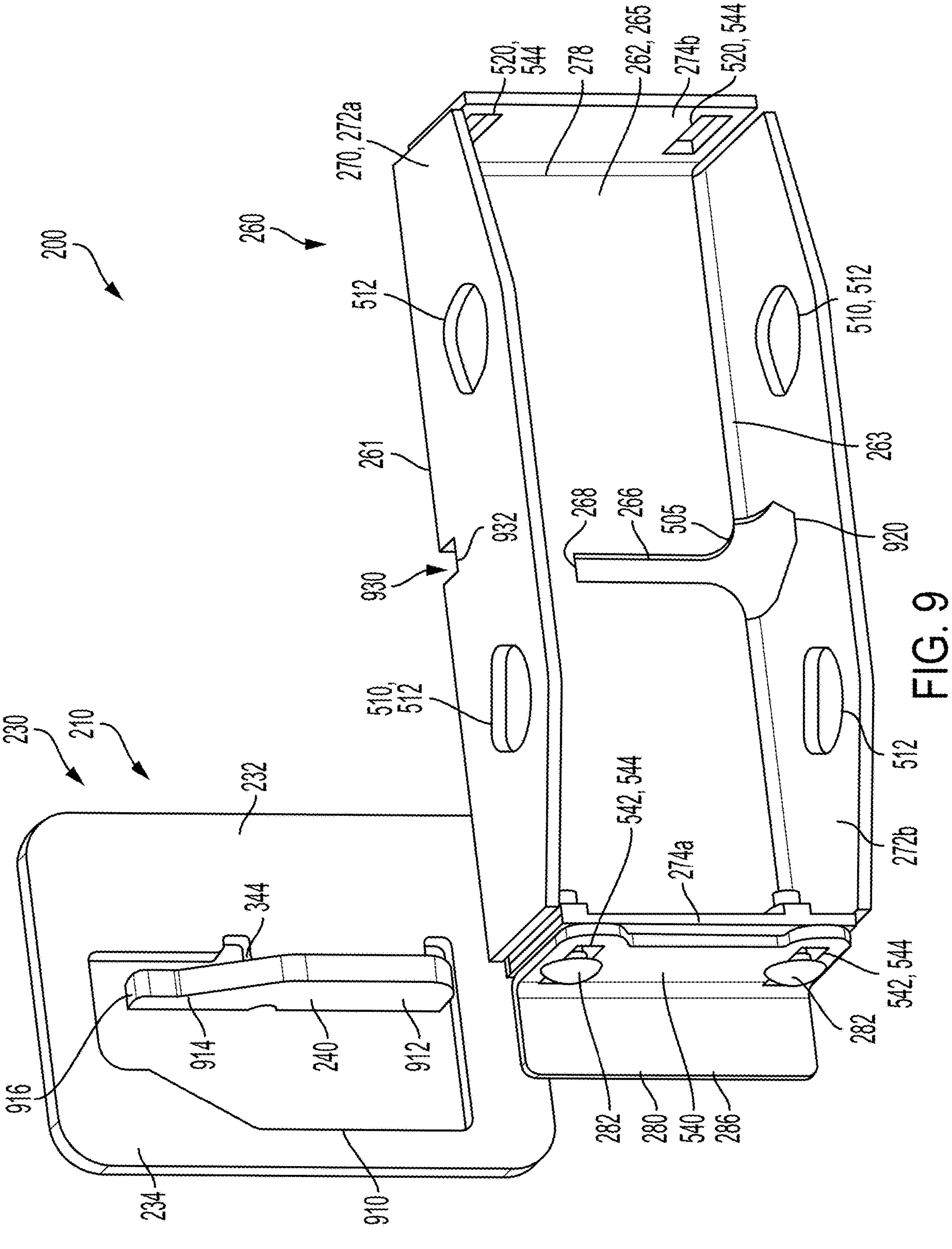
FIG. 9 is an exploded perspective view of the door lock device comprising the door mount and the lock assembly, according to another aspect of the present disclosure.

FIG. 9 illustrates an exploded perspective view of the door lock device 200, in accordance with another example aspect of the disclosure. The door lock device 200 can comprise the door mount 210 and the lock assembly 260. The door lock device 200 can further comprise the retainer bracket assembly 290 (shown in FIG. 2). As previously described, the door mount 210 can be secured to the door panel 110 (shown in FIG. 1), and the retainer bracket assembly 290 can be secured to the door frame 130 (shown in FIG. 1) or other suitable structure adjacent to the door 100 (shown in FIG. 1). The lock assembly 260 can be selectively mounted to the door mount 210 and can engage the retainer bracket assembly 290 to lock the door 100 in the closed position as needed.

According to example aspects, the door mount 210 can comprise the front mounting assembly 230. In some aspects, the door mount 210 can further comprise the rear base plate 320 (shown in FIG. 3). The door mount 210 can be secured to the door 100 by one or more mounting fasteners 212 (shown in FIG. 2), as previously described. The mounting fasteners 212 can be any suitable fastener known in the art, including but not limited to, bolts, screws, rivets, adhesives, and the like. In some aspects, the mounting fasteners 212 can include the tamper-resistant feature, such that the mounting fasteners 212 can be difficult or impossible to remove from the door mount 210 with a standard tool (such as a combination wrench or a Phillips screwdriver) when standing on the rear door side of the door 100.

The front mounting assembly 230 can comprise the front base plate 232. The front base plate 232 can define the front inner surface 333 (shown in FIG. 3) and the front outer surface 234 opposite the front inner surface 333. In the present aspect, the mounting guide 240 can be monolithically formed with the front base plate 232, as shown. For example, the mounting guide 240 can be formed by a cut-out 910 in the front base plate 232, and the mounting guide 240 can be bent relative to the front base plate 232 to extend outwardly therefrom. In some aspects, the mounting guide 240 can be about perpendicular to the front base plate 232. The mounting guide 240 can be connected to front base plate 232 along a lower guide portion 912 of the mounting guide 240, while the mounting guide 240 can be disconnected from the front base plate 232 along an upper guide portion 914 of the mounting guide 240. That is, the cut-out 910 can substantially surround the upper guide portion 914 of the mounting guide 240. The upper guide portion 914 can define a distal upper guide end 916 distal to the lower guide portion 912. The lower guide portion 912 can define the guide shoulder 344 connected to the front base plate 232 and configured to support the lock assembly 260 thereon, as described in further detail below. The front mounting assembly 230 of the present aspect does not comprise the guide cap 250 (shown in FIG. 2) in the present aspect, but may comprise the guide cap 250 in other aspects.

The lock assembly 260 can comprise the attachment plate 262 configured to selectively mount the lock assembly 260 on the door mount 210. The attachment plate 262 can define the plate upper end 261, the plate lower end 263, the attachment inner surface 564 (shown in FIG. 5), and the attachment outer surface 265. The attachment inner surface 564 can be configured to confront the front base plate 232 when mounted on the door mount 210. The lock assembly 260 can further comprise the lock frame 270. The lock frame 270 can comprise the first lateral frame member **272*a* extending forwardly outward from the attachment plate 262 at or near the plate upper end 261 and the second lateral frame member 272*b* extending forwardly outward from the attachment plate 262 at or near the plate lower end 263. The lock frame 270 can further comprise the first longitudinal frame member 274*a* extending outward from the attachment plate 232 at or near the plate first side 276 (shown in FIG. 2) thereof and the second longitudinal frame member 274*b* extending outward from the attachment plate 232 at or near the plate second side 278 thereof. Each of the first and second longitudinal frame members 274*a,b* can extend between the first and second lateral frame members 272*a,b***.

Each of the first and second lateral frame members **272*a,b* can define a handle opening 510. In other aspects, only one or neither of the first and second lateral frame members 272*a,b* may define the handle opening 510. A user can extend a hand or fingers into the handle opening 510 and can grip the corresponding first and/or second lateral frame members 272*a,b* to facilitate handling the lock assembly 260 to mount and remove the lock assembly 260 to and from the door mount 210. In the present aspect, the handle opening 510 of the first lateral frame member 272*a* can be formed as a pair of the grippable openings 512, and the handle opening 510 of the second lateral frame member 272*b* can also be formed as a pair of the grippable openings 512. In other aspects, the handle opening 510 in either or both of the first and second lateral frame members 272*a,b* can be formed as the single grippable opening 512, as shown in FIG. 5**.

The attachment plate 262 can define the mounting slot 266 extending from the plate lower end 263 towards the plate upper end 261. The lower portion 505 of the mounting slot 266 can taper outwards (i.e., increase in width) towards the plate lower end 263. A lower slot portion 920 of the mounting slot 266 can further extend into the second lateral frame member **272*b*. Additionally, in the present aspect, the attachment plate 262 can define a lock opening 930 formed at the plate upper end 261. An upper opening portion 932 of the lock opening 930 can further extend into the first lateral frame member 272*a*, as shown. In some aspects, the lock opening 930 may be formed in the first lateral frame member 272*a* only. The lock opening 930 can substantially longitudinally aligned with the mounting slot 266**, as shown.

To mount the attachment plate 262 to the door mount 210, the mounting slot 266 can be aligned vertically above the mounting guide 240, relative to the orientation shown. The attachment plate 262 can then be lowered onto the door mount 210 with the mounting guide 240 engaging and sliding vertically within the mounting slot 266. According to example aspects, the guide shoulder 344 of the mounting guide 240 can engage the upper slot end 268 of the mounting slot 266 to support the lock assembly 260 on the door mount 210. Furthermore, the upper guide portion 914 of the mounting guide 240 can extend upward along the attachment outer surface 265 of the attachment plate 262, and the distal upper guide end 916 can engage the lock opening 930 of the lock assembly 260.

Example aspects of the lock assembly 260 can further comprise the lock bracket 280. The lock bracket 280 can comprise the securing plate 540 and the lock tab 286 extending from the securing plate 540. The lock bracket 280 can be coupled to the first longitudinal frame member **274*a* of the lock frame 270. The frame fasteners 282 can couple the lock bracket 280 to the first longitudinal frame member 274*a*. In other aspects, the lock bracket 280 can be coupled to the second longitudinal frame member 274*b*. The lock tab 286 can extend laterally outward from the first longitudinal frame member 274*a* and the securing plate 540, as shown. As previously described, the lock tab 286 of the lock bracket 280 can be configured to engage the retainer bracket assembly 290 in the locked configuration to lock door 100** in the closed position.

According to example aspects, the securing plate 540 can define the one or more plate openings 542 formed therethrough. In the present aspect, the securing plate 540 can define two of the plate openings 542, and each of the plate openings 542 can be aligned with a corresponding one of the frame openings 520 formed through the first longitudinal frame member **274*a*. The frame fasteners 282 can engage each corresponding pair of frame openings 520 and plate openings 542 to couple the lock bracket 280 to the first longitudinal frame member 274*a*. In the present aspect, each of the plate openings 542 and each of the frame openings 520 can be formed as a lateral adjustment slot 544**.

The frame fastener 282 can slide laterally within each of the corresponding plate opening 542 and the corresponding frame opening 520 when the frame fastener 282 is loosened to reposition the lock bracket 280 relative to the lock frame 270, as needed. For example, the lock bracket 280 can be repositioned forward or rearward, relative to the orientation shown, to properly align the lock tab 286 of the lock bracket 280 with the retainer channel 298 (shown in FIG. 2) of the retainer bracket assembly 290. Forming both the plate openings 542 and the frame openings 520 as lateral adjustment slots 544 can increase the range to which the lock bracket 280 can be repositioned relative to the lock frame 270. In example aspects, the frame openings 520 can also be formed through the second longitudinal frame member **274*b* to allow the lock bracket 280 to alternatively be coupled to the second longitudinal frame member 274*b***.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A door lock device comprising:
- a door mount configured to be coupled to a door;
- a lock assembly removably mounted on the door mount and comprising a lock tab; and
- a retainer bracket assembly configured to be coupled to a structure adjacent to the door, the retainer bracket assembly at least partially defining a retainer channel, the lock tab engaging the retainer channel in a locked configuration to lock the door in a closed position;

wherein:
- the door mount comprises a mounting guide, the mounting guide defining a guide shoulder;
- the lock assembly defines a mounting slot;
- the mounting guide slidably engages the mounting slot to mount the locking assembly on the guide shoulder of the door mount;
- the mounting guide defines an upper guide portion and a lower guide portion;
- the upper guide portion defines a distal upper guide end distal to the lower guide portion;
- the lock assembly further defines a lock opening longitudinally aligned with the mounting slot; and
- the distal upper guide end engages the lock opening of the lock assembly.

2. The door lock device of claim 1, wherein:
- the door mount further comprises a front base plate configured to be coupled to the door;
- the front base plate is formed monolithically with the mounting guide; and
- the mounting guide is bent relative to the front base plate to be about perpendicular to the front base plate.

3. The door lock device of claim 1, wherein the lock assembly comprises:
- an attachment plate defining the mounting slot;
- a lock bracket defining the lock tab; and
- a lock frame coupled to the attachment plate, wherein the lock frame comprises a first longitudinal frame member extending along a plate first side of the attachment plate, and wherein the lock bracket is mounted to the first longitudinal frame member.

4. The door lock device of claim 3, wherein the lock frame further comprises:
- a second longitudinal frame member extending along a plate second side of the attachment plate and about perpendicular to the attachment plate;
- a first lateral frame member extending along a plate upper end of the attachment plate and about perpendicular to the attachment plate; and
- a second lateral frame member extending along a plate lower end of the attachment plate and about perpendicular to the attachment plate.

5. The door lock device of claim 4, wherein the lock frame is formed monolithically with the attachment plate, and wherein each of the first longitudinal frame member, the second longitudinal frame member, the first lateral frame member, and the second lateral frame member are bent relative to the attachment plate.

6. The door lock device of claim 4, wherein at least one of the first lateral frame member or the second lateral frame member defines a handle opening configured to be gripped by a user to facilitate handling the lock assembly.

7. The door lock device of claim 3, wherein:
- the lock bracket defines a plate opening;
- the first longitudinal frame member defines a frame opening;
- a frame fastener engages each of the plate opening and the frame opening to couple the lock bracket to the first longitudinal frame member;
- at least one of the plate opening or the frame opening is formed as a lateral adjustment slot; and
- the frame fastener is configured to slide within the lateral adjustment slot to selectively reposition the lock bracket relative to the lock frame.

8. The door lock device of claim 7, wherein:
- the lock bracket comprises a securing plate defining the plate opening;
- the securing plate is coupled to the first longitudinal frame member by the frame fastener; and
- the lock tab extends from and is about perpendicular to the securing plate.

9. A door lock device comprising:
- a door mount configured to be coupled to a door;
- a lock assembly removably mounted on the door mount and comprising a lock tab; and
- a retainer bracket assembly configured to be coupled to a structure adjacent to the door, the retainer bracket assembly at least partially defining a retainer channel, the lock tab engaging the retainer channel in a locked configuration to lock the door in a closed position;

wherein:
- the door mount comprises a mounting guide, the mounting guide defining a guide shoulder;
- the lock assembly defines a mounting slot;
- the mounting guide slidably engages the mounting slot to mount the locking assembly on the guide shoulder of the door mount;
- an attachment plate defining the mounting slot;
- a lock bracket defining the lock tab; and
- a lock frame coupled to the attachment plate, wherein the lock frame comprises a first longitudinal frame member extending along a plate first side of the attachment plate, and wherein the lock bracket is mounted to the first longitudinal frame member.

10. The door lock device of claim 9, wherein the lock frame further comprises:
- a second longitudinal frame member extending along a plate second side of the attachment plate and about perpendicular to the attachment plate;

a first lateral frame member extending along a plate upper end of the attachment plate and about perpendicular to the attachment plate; and a second lateral frame member extending along a plate lower end of the attachment plate and about perpendicular to the attachment plate.

11. The door lock device of claim 10, wherein the lock frame is formed monolithically with the attachment plate, and wherein each of the first longitudinal frame member, the second longitudinal frame member, the first lateral frame member, and the second lateral frame member are bent relative to the attachment plate.

12. The door lock device of claim 10, wherein at least one of the first lateral frame member or the second lateral frame member defines a handle opening configured to be gripped by a user to facilitate handling the lock assembly.

13. The door lock device of claim 9, wherein:

the lock bracket defines a plate opening;

the first longitudinal frame member defines a frame opening;

a frame fastener engages each of the plate opening and the frame opening to couple the lock bracket to the first longitudinal frame member;

at least one of the plate opening or the frame opening is formed as a lateral adjustment slot; and the frame fastener is configured to slide within the lateral adjustment slot to selectively reposition the lock bracket relative to the lock frame.

14. The door lock device of claim 13, wherein:

the lock bracket comprises a securing plate defining the plate opening;

the securing plate is coupled to the first longitudinal frame member by the frame fastener; and the lock tab extends from and is about perpendicular to the securing plate.

15. The door lock device of claim 9, wherein:

the door mount further comprises a front base plate configured to be coupled to the door;

the front base plate is formed monolithically with the mounting guide; and the mounting guide is bent relative to the front base plate to be about perpendicular to the front base plate.

* * * * *